E. W. CUMMINS.
CLAMP.
APPLICATION FILED MAR. 21, 1917.

1,256,208.

Patented Feb. 12, 1918.

WITNESSES

INVENTOR
EDWARD W. CUMMINS,
BY
ATTORNEYS

UNITED STATES PATENT OFFICE.

EDWARD W. CUMMINS, OF HARRISBURG, ILLINOIS.

CLAMP.

1,256,208.  Specification of Letters Patent.  Patented Feb. 12, 1918.

Application filed March 21, 1917. Serial No. 156,397.

*To all whom it may concern:*

Be it known that I, EDWARD W. CUMMINS, a citizen of the United States, and a resident of Harrisburg, in the county of Saline and State of Illinois, have invented an Improvement in Clamps, of which the following is a specification.

My invention is an improvement in clamps, and has for its object to provide a device of the character specified, especially adapted for use in the operation of circumcising wherein the arrangement is such that the prepuce is firmly clamped in such a manner that there will be no appreciable loss of blood in severing the skin and where the parts are held in such position that they may be easily sutured.

Figure 1:
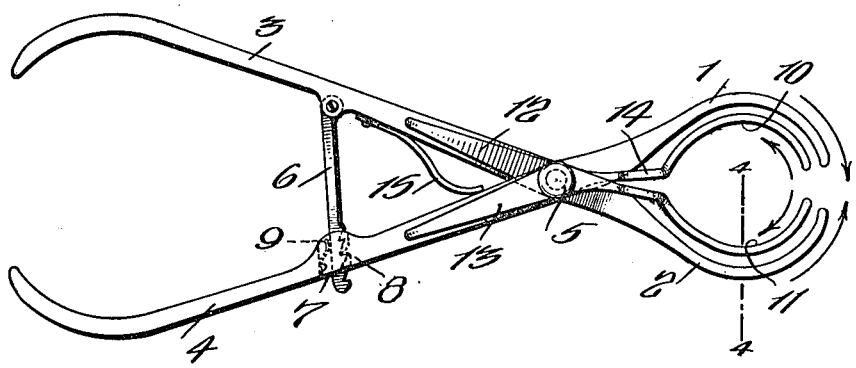
Figure 1 is a top plan view of the improved clamp.
Figure 2:
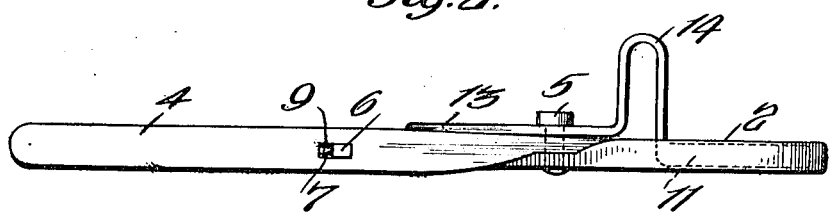
Fig. 2 is an edge view.
Figure 3:
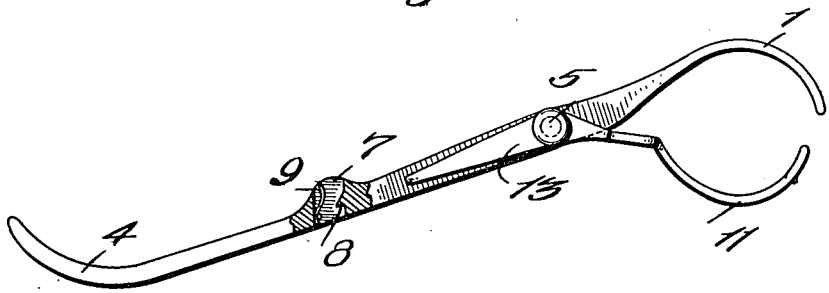
Fig. 3 is a view of one of the blades with parts in section.

The improved clamp comprises a pair of outer blades and a pair of inner blades, the inner blades being inserted within the prepuce and gripped with the outer blades on the outside to firmly clamp the same. The outer blades 1 and 2 have shanks or handles 3 and 4, respectively, pivotally connected as indicated at 5, and the handle or shank 3 has a ratchet bar 6 pivoted thereto, which passes through an opening 7 in the shank 4 and is adapted to engage a tooth 8 in the opening to hold the parts in clamped position. A spring 9 is arranged within the opening at the opposite side from the tooth, the said tooth acting to press the ratchet bar into engagement with the tooth 8. Each of the blades 1 and 2 is curved or arc shaped as shown, and the inner blades 10 and 11 are curved to fit the inner faces of the blades 1 and 2, and each of the blades has a handle or shank 12 and 13, respectively.

Figure 4:
Fig. 4 is a section along line 4—4 of Fig. 1.

These shanks or handles are pivotally connected together by the pivot pin 5 before mentioned, and the said shanks 12 and 13 are secured to the shanks 3 and 4 in such manner that when the handles are moved toward or from each other the shanks 12 and 13 will also be moved toward or from each other, and the blades 10 and 11 will move toward the blades 1 and 2. Thus when the shanks 3 and 4 are moved apart the blades 10 and 11 will also be moved away from the blades 1 and 2, while when the shanks 3 and 4 are moved toward each other the blades 1 and 10 and 2 and 11 will be approached. It will be noticed that the shank of each blade 10 and 11 has an outwardly bent portion indicated at 14 so arranged that the blade will register with the adjacent blade 1 and 2 as the case may be. The shanks 3 and 4 are pressed away from each other by the spring 15 and the inner faces of the blades 1, 2, 10 and 11 are corrugated as shown in Fig. 4.

In operation the fore skin is pulled out from the glans and the clamp is applied, the inner blades of the clamp being placed on the inside of the prepuce and the outer blades on the outside. Then the handles are pressed together moving the pairs of blades into contact with the inner and outer surfaces of the prepuce, and the ratchet bar by its engagement with the teeth holds the clamp pressed firmly together.

The prepuce is then cut off leaving a margin of approximately one-eighth of an inch of the raw edges to stitch together.

After the suturing is complete the clamp is removed and the operation is complete. With the improved clamp it is not necessary that the hand come in contact with the wound, and since no bleeding follows until after the clamp is removed the necessity of sponging is eliminated, and the possibility of infection is greatly lessened.

I claim:

1. A clamp of the character specified, comprising pivotally arranged pairs of blades, each pair comprising an inner and outer blade, the outer blades having handles and the inner blades having shanks, the handles being pivoted together in crossed relation, and the shank of each inner blade being connected to the opposite handle to cause the shank to swing therewith, a spring normally pressing the handles apart, and adjustable means for holding the blades in clamped position.

2. A clamp of the character specified, comprising two pairs of blades, each pair comprising an inner and an outer blade shaped to fit each other and coöperate in clamping action when they are moved toward each other, the outer blades having handles pivoted together in crossed relation and the inner blades having shanks which are connected to the opposite handles to cause the shanks to swing therewith to cause the inner blades to move toward the outer blades when the pairs of blades are moved toward each other.

In testimony whereof I affix my signature in the presence of two witnesses.

EDWARD W. CUMMINS.

Witnesses:
O. M. KANAKER,
W. W. WHEATLEY.